United States Patent
Kagoshima

(10) Patent No.: US 10,950,227 B2
(45) Date of Patent: Mar. 16, 2021

(54) SOUND PROCESSING APPARATUS, SPEECH RECOGNITION APPARATUS, SOUND PROCESSING METHOD, SPEECH RECOGNITION METHOD, STORAGE MEDIUM

(71) Applicant: KABUSHIKI KAISHA TOSHIBA, Tokyo (JP)

(72) Inventor: Takehiko Kagoshima, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/904,738

(22) Filed: Feb. 26, 2018

(65) Prior Publication Data

US 2019/0080689 A1     Mar. 14, 2019

(30) Foreign Application Priority Data

Sep. 14, 2017    (JP) ................. 2017-177022

(51) Int. Cl.
| | |
|---|---|
| *G10L 15/20* | (2006.01) |
| *G10L 15/22* | (2006.01) |
| *G10L 15/06* | (2013.01) |
| *G10L 15/02* | (2006.01) |
| *G01S 5/18* | (2006.01) |
| *G10L 15/00* | (2013.01) |

(Continued)

(52) U.S. Cl.
CPC ............... *G10L 15/20* (2013.01); *G01S 5/18* (2013.01); *G10L 15/00* (2013.01); *G10L 15/02* (2013.01); *G10L 15/063* (2013.01); *G10L 15/22* (2013.01); *G10L 25/51* (2013.01); *G10L 25/30* (2013.01)

(58) Field of Classification Search
CPC ......... G10L 15/20; G10L 15/00; G10L 25/51; G10L 15/22; G10L 15/063; G10L 15/02; G10L 25/30; G01S 5/18
USPC .......................................................... 704/233
See application file for complete search history.

(56) References Cited

U.S. PATENT DOCUMENTS

| | | |
|---|---|---|
| D567,814 S | 4/2008 | Zalewski et al. |
| D571,367 S | 6/2008 | Goto et al. |
| D571,806 S | 6/2008 | Goto |

(Continued)

FOREIGN PATENT DOCUMENTS

| | | |
|---|---|---|
| JP | 2008-079256 A | 4/2008 |
| JP | 2010-256421 A | 11/2010 |

(Continued)

*Primary Examiner* — Bharatkumar S Shah
(74) *Attorney, Agent, or Firm* — Knobbe, Martens, Olson & Bear, LLP

(57) ABSTRACT

According to one embodiment, a sound processing apparatus extracts a feature of first speech uttered outside an objective area from first speech obtained at positions different from each other in a space of the objective area and a place outside the objective area. The apparatus creates, by learning, a determination model configured to determine whether an utterance position of second speech in the space is outside the objective area based at least in part on the feature uttered outside the objective area. The apparatus eliminates a portion of the second speech uttered outside the objective area from the second speech obtained by a second microphone based at least in part on the feature and the model. The apparatus detects and outputs remaining speech from the second speech.

10 Claims, 7 Drawing Sheets

(51) Int. Cl.
   *G10L 25/51*   (2013.01)
   *G10L 25/30*   (2013.01)

(56) References Cited

U.S. PATENT DOCUMENTS

| | | | |
|---|---|---|---|
| D572,254 S | 7/2008 | Goto | |
| D621,836 S | 8/2010 | Zalewski | |
| D629,000 S | 12/2010 | Zalewski et al. | |
| D630,211 S | 1/2011 | Goto et al. | |
| 8,210,943 B1 | 7/2012 | Woodard et al. | |
| 2003/0217158 A1 | 11/2003 | Datta | |
| 2004/0017473 A1 | 1/2004 | Marks | |
| 2004/0207597 A1 | 10/2004 | Marks | |
| 2005/0047611 A1 | 3/2005 | Mao | |
| 2005/0059488 A1 | 3/2005 | Larsen et al. | |
| 2005/0226431 A1 | 10/2005 | Mao | |
| 2006/0074686 A1 | 4/2006 | Vignoli | |
| 2006/0274032 A1 | 7/2006 | Mao et al. | |
| 2006/0204012 A1 | 9/2006 | Marks et al. | |
| 2006/0233389 A1 | 10/2006 | Mao et al. | |
| 2006/0239471 A1 | 10/2006 | Mao et al. | |
| 2006/0252474 A1 | 11/2006 | Zalewski et al. | |
| 2006/0252475 A1 | 11/2006 | Zalewski et al. | |
| 2006/0252477 A1 | 11/2006 | Zalewski et al. | |
| 2006/0252541 A1 | 11/2006 | Zalewski et al. | |
| 2006/0256081 A1 | 11/2006 | Zalewski et al. | |
| 2006/0264258 A1 | 11/2006 | Zalewski et al. | |
| 2006/0264259 A1 | 11/2006 | Zalewski et al. | |
| 2006/0264260 A1 | 11/2006 | Zalewski et al. | |
| 2006/0269072 A1* | 11/2006 | Mao | H04R 29/005 381/56 |
| 2006/0269073 A1 | 11/2006 | Mao | |
| 2006/0274911 A1 | 12/2006 | Mao et al. | |
| 2006/0277571 A1 | 12/2006 | Marks et al. | |
| 2006/0280312 A1 | 12/2006 | Mao | |
| 2006/0282873 A1 | 12/2006 | Zalewski et al. | |
| 2006/0287084 A1 | 12/2006 | Mao et al. | |
| 2006/0287085 A1 | 12/2006 | Mao et al. | |
| 2006/0287086 A1 | 12/2006 | Zalewski et al. | |
| 2006/0287087 A1 | 12/2006 | Zalewski et al. | |
| 2007/0015558 A1 | 1/2007 | Zalewski et al. | |
| 2007/0015559 A1 | 1/2007 | Zalewski et al. | |
| 2007/0021208 A1 | 1/2007 | Mao et al. | |
| 2007/0025562 A1* | 2/2007 | Zalewski | H04R 3/005 381/92 |
| 2007/0060336 A1 | 3/2007 | Marks et al. | |
| 2007/0060350 A1 | 3/2007 | Osman | |
| 2007/0061142 A1 | 3/2007 | Hernandez-Abrego et al. | |
| 2007/0061413 A1 | 3/2007 | Larsen et al. | |
| 2007/0061851 A1 | 3/2007 | Deshpande et al. | |
| 2007/0117625 A1 | 5/2007 | Marks et al. | |
| 2007/0223732 A1 | 9/2007 | Mao | |
| 2007/0243930 A1 | 10/2007 | Zalewski et al. | |
| 2007/0244751 A1 | 10/2007 | Zalewski et al. | |
| 2007/0255630 A1 | 11/2007 | Zalewski et al. | |
| 2007/0258599 A1 | 11/2007 | Mao | |
| 2007/0260340 A1 | 11/2007 | Mao | |
| 2007/0260517 A1 | 11/2007 | Zalewski et al. | |
| 2007/0261077 A1 | 11/2007 | Zalewski et al. | |
| 2007/0263003 A1 | 11/2007 | Ko et al. | |
| 2007/0265075 A1 | 11/2007 | Zalewski | |
| 2007/0274535 A1 | 11/2007 | Mao | |
| 2007/0298882 A1 | 12/2007 | Marks et al. | |
| 2008/0009348 A1 | 1/2008 | Zalewski et al. | |
| 2008/0220867 A1 | 9/2008 | Zalewski et al. | |
| 2008/0261693 A1 | 10/2008 | Zalewski | |
| 2009/0122146 A1 | 5/2009 | Zalewski et al. | |
| 2009/0298590 A1 | 12/2009 | Marks et al. | |
| 2010/0007582 A1 | 1/2010 | Zalewski | |
| 2010/0105475 A1 | 4/2010 | Mikhailov et al. | |
| 2010/0105480 A1 | 4/2010 | Mikhailov et al. | |
| 2010/0118840 A1 | 5/2010 | Suda et al. | |
| 2010/0144436 A1 | 6/2010 | Marks et al. | |
| 2010/0273553 A1 | 10/2010 | Zalewski | |
| 2010/0277485 A1 | 11/2010 | Zalewski | |
| 2010/0285883 A1 | 11/2010 | Zalewski | |
| 2010/0304868 A1 | 12/2010 | Zalewski | |
| 2010/0306402 A1 | 12/2010 | Russell et al. | |
| 2011/0086708 A1 | 4/2011 | Zalewski et al. | |
| 2011/0118031 A1 | 5/2011 | Mao et al. | |
| 2011/0118032 A1 | 5/2011 | Zalewski | |
| 2011/0159813 A1 | 6/2011 | Mallinson et al. | |
| 2011/0159814 A1 | 6/2011 | Mallinson et al. | |
| 2011/0159959 A1 | 6/2011 | Mallinson et al. | |
| 2011/0242134 A1 | 6/2011 | Miller et al. | |
| 2011/0216002 A1 | 9/2011 | Weising et al. | |
| 2011/0216060 A1 | 9/2011 | Weising et al. | |
| 2011/0298829 A1 | 12/2011 | Stafford et al. | |
| 2012/0190448 A1 | 7/2012 | Larsen et al. | |
| 2012/0272179 A1 | 10/2012 | Stafford | |
| 2012/0295708 A1 | 11/2012 | Hernandez-Abrego et al. | |
| 2012/0302349 A1 | 11/2012 | Marks et al. | |
| 2013/0041648 A1 | 2/2013 | Osman | |
| 2013/0084981 A1* | 4/2013 | Zalewski | A63F 9/24 463/36 |
| 2014/0361977 A1* | 12/2014 | Stafford | G02B 27/0093 345/156 |
| 2015/0117652 A1 | 4/2015 | Sato et al. | |
| 2017/0045941 A1 | 2/2017 | Tokubo et al. | |

FOREIGN PATENT DOCUMENTS

| | | |
|---|---|---|
| JP | 2011-139409 A | 7/2011 |
| JP | 4837917 B2 | 12/2011 |
| JP | 4886770 B2 | 2/2012 |
| JP | 5339501 B2 | 11/2013 |
| JP | 5482844 B2 | 5/2014 |
| JP | 2015-069063 A | 4/2015 |
| JP | 2016-126022 A | 7/2016 |
| WO | WO 2013/179464 A1 | 12/2013 |

* cited by examiner

|  | Time difference (ms) | | Power difference (dB) | | Determination |
|---|---|---|---|---|---|
| x1 | 1.2 | -1.1 | -1.5 | 0.4 | 1 |
| x2 | 1.5 | -1.3 | 0.2 | 0.6 | 1 |
| x3 | 1.3 | -1.3 | -0.5 | 0.2 | 1 |
| ⋮ | ⋮ | ⋮ | ⋮ | ⋮ | ⋮ |
| x1000 | 1.7 | -1.4 | 0.1 | -0.2 | 1 |
| z1 | 0.2 | 0.3 | 0.3 | 0.2 | 0 |
| z2 | -0.4 | 0.1 | 0.7 | -0.5 | 0 |
| z3 | -0.1 | -0.2 | -0.1 | 0.1 | 0 |
| ⋮ | ⋮ | ⋮ | ⋮ | ⋮ | ⋮ |
| z2000 | -0.3 | 0.2 | 0.5 | 0.3 | 0 |

FIG. 6

SOUND PROCESSING APPARATUS, SPEECH RECOGNITION APPARATUS, SOUND PROCESSING METHOD, SPEECH RECOGNITION METHOD, STORAGE MEDIUM

CROSS-REFERENCE TO RELATED APPLICATIONS

This application is based upon and claims the benefit of priority from Japanese Patent Application No. 2017-177022, filed Sep. 14, 2017, the entire contents of which are incorporated herein by reference.

FIELD

Embodiments described herein relate generally to a sound processing apparatus, speech recognition apparatus, sound processing method, speech recognition method, storage medium.

BACKGROUND

Heretofore, a speech recognition apparatus records a speech of an objective speaker by means of a microphone, detects an objective section to be speech-recognized from the recorded signals, and carries out recognition processing with respect to the speech of the detected section. At this time, if a speech, noise or the like other than the objective speech enters the microphone, the recognition processing is carried out in a state where the speech, noise or the like other than the objective speech is erroneously detected as the speech section, and thus an erroneous and useless recognition result is output. Thus, heretofore, a technique for detecting a target speech section by using a plurality of microphone arrays on the basis of the position of the sound source has been developed. For example, a technique for emphasizing only a speech having a sound-source position in the objective area by controlling the directivity of each of the plurality of microphone arrays, and technique for estimating a sound-source position of an input speech by collating a feature of a speech collected by a plurality of microphones with a dictionary of feature sound-source positions of which are known are disclosed.

The problem of false recognition due to mixture of a speech, noise or the like other than the objective speech described above hardly occurs in the case where a speech is collected by a microphone near the mouth with the push of an utterance-start button. Conversely, when the speech is collected by a microphone at a distance or when the speech is collected in a hands free state without the push of a button, the above problem is liable to occur. For example, a case where voice-activation of a TV set is realized by using a microphone incorporated in the TV set, case where article explanation based on a speech dialogue is realized by using a microphone incorporated in an information processing terminal arranged in a store front, and the like are conceivable. In such examples, the number of microphones or positions of microphones differ depending on the apparatus in which the microphones are incorporated, and the objective area in which the speech is to be recognized differs depending on the site on which the apparatus is placed or on the purpose of the apparatus. For this reason, customization corresponding to the objective area is required for each apparatus, however, realization thereof is extremely difficult.

As described above, in the conventional speech recognition apparatus, there is a problem that it is difficult to carry out customization corresponding to the objective area for each apparatus. Particularly, in the method of emphasizing only a speech having a sound-source position in the objective area by controlling the directivity of each of the plurality of microphone arrays, a setting operation of controlling the directivity of the microphone array on the basis of measurement of a relative positional relationship between the microphone array and the objective area is required, and it is difficult for a non-specialist to carry out the setting operation. Further, also in the method of estimating a sound-source position of an input speech by collating a feature of a speech collected by a plurality of microphones with a dictionary of feature sound-source positions of which are known, collation cannot be carried out unless the sound-source position is a position for which a dictionary is prepared in advance, and hence the method cannot be utilized in an unknown environment.

BRIEF DESCRIPTION OF THE DRAWINGS

FIG. 6 is a view showing an example of learning data of a neural network to be used in a determination model of the sound processing apparatus according to the second embodiment.

DETAILED DESCRIPTION

In general, according to one embodiment, a sound processing apparatus includes a plurality of first microphones, a feature extractor, a determination model creator, a second microphone, and a speech detector. The first microphones arranges at positions different from each other in the space in which a place outside the objective area exists. The feature extractor extracts a feature from a speech collected by the plurality of first microphones. The determination model creator creates, by learning, a determination model configured to determine whether or not an utterance position of a speech in the space is outside the objective area on the basis of a feature of a speech uttered outside the objective area extracted by the feature extractor. The second microphone arranged in the space. The speech detector eliminates the speech uttered outside the objective area from a speech collected by the second microphone on the basis of the feature and the determination model, and detect and output the remaining speech.

Hereinafter, a sound processing apparatus according to an embodiment of the present invention will be described.

First Embodiment

Figure 1:
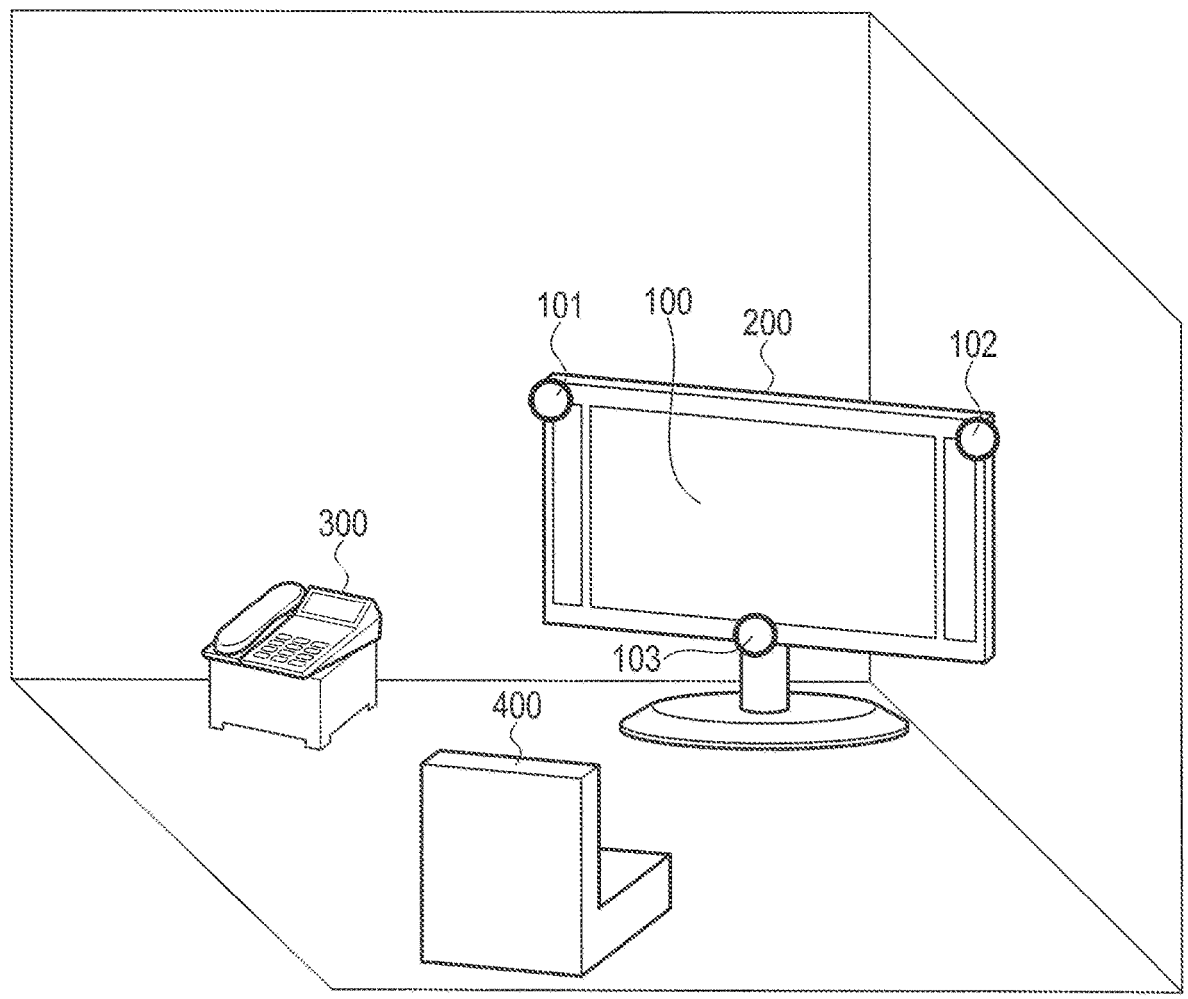
FIG. 1 is an arrangement view showing an operation example of a sound processing apparatus according to a first embodiment provided with a speech recognition function.

FIG. 1 shows a room in which a TV set 200 incorporating therein a sound processing apparatus 100 according to a first embodiment, telephone set 300, and chair 400 are arranged. In the TV set 200, microphones 101, 102, and 103 of the sound processing apparatus 100 are each incorporated at the upper right and left positions, and at the lower central position of the display screen. The sound processing apparatus 100 of this embodiment is provided with a function of collecting a speech command uttered from a user by means of the microphones 101 to 103, and speech-recognizing the sound-collection result to thereby control the TV set 200. Under such circumstances, in the sound processing apparatus 100, there is a possibility of the sound of the bell of the telephone set 300 or speech of a person having a conversation over the telephone set 300 being erroneously recognized as a speech command, and there is also a possibility of a malfunction of the TV set 200 being caused. Thus, in the sound processing apparatus 100 according to this embodiment, in the initial setting mode, positions in the room desired to be excluded from the speech-recognition area are registered in advance as positions outside the objective area and, in the operation mode, control is carried out in such a manner that speeches from the registered positions are excluded, and speeches from positions other than the registered positions are recognized.

Figure 2:
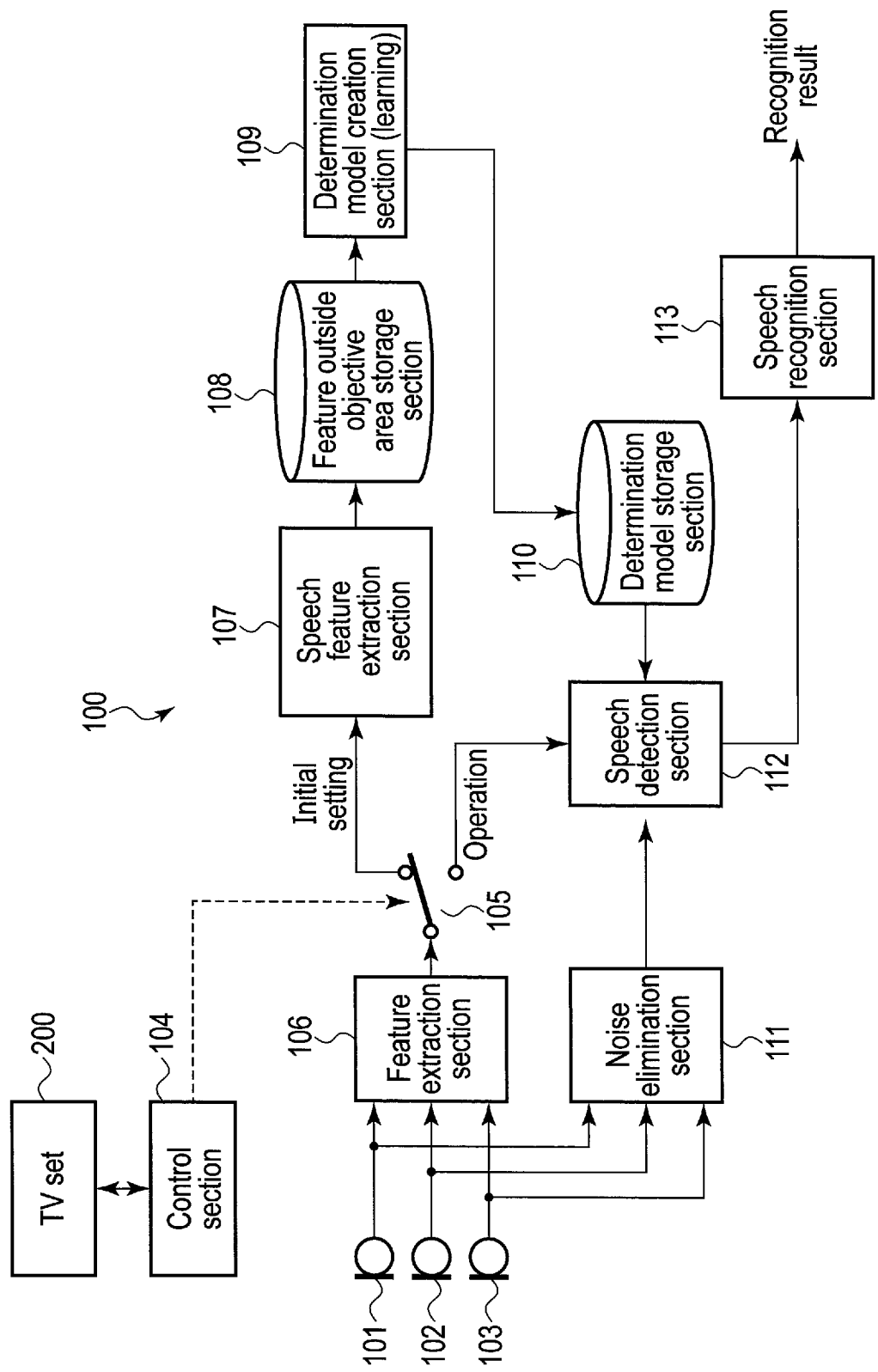
FIG. 2 is a block diagram showing the configuration of the sound processing apparatus according to the first embodiment.

FIG. 2 is a block diagram showing the configuration of the sound processing apparatus 100 according to this embodiment incorporating therein a speech recognition function and incorporated in the TV set 200.

In FIG. 2, the microphones 101, 102, and 103 are respectively installed at the upper left and right positions and at the lower central position of the TV set 200.

When the user operates the TV set 200 to place the TV set 200 in the initial setting mode/operation mode of speech recognition, a control section 104 receives a notification of the initial setting mode/operation mode of speech recognition to be supplied from the TV set 200 to the sound processing apparatus 100, and selectively switches between processing for initial setting and processing at the time of an operation to thereby execute the selected operation. A switch 105 carries out input-switching between the initial setting mode and operation mode of speech recognition.

A feature extraction section 106 converts a speech of the user collected by means of the microphones 101, 102, and 103 into digital data to thereby create speech signals of three channels, and extracts a feature from the speech signals of the three channels at fixed frame periods (for example 8 ms). As the feature, in addition to feature to be calculated for each channel such as various spectrum parameters (FFT spectrum, cepstrum, LPC, and the like), power, and SNR, feature to be calculated between a plurality of channels such as a time difference, phase difference, power difference, and the like between channels can be used.

A speech feature extraction section 107 removes a feature of the background sound part from the feature extracted by the feature extraction section 106 and supplied thereto through the switch 105 to thereby extract a feature of the speech part. A feature outside objective area storage section 108 stores therein the feature of the speech part extracted by the speech feature extraction section 107.

A determination model creation section 109 creates a determination model configured to determine whether or not the sound-source position of the input speech at the time of the operation is outside the objective area by learning on the basis of the feature outside the objective area stored in the feature outside objective area storage section 108. A determination model storage section 110 stores therein the determination model created by learning.

A noise elimination section 111 subjects the speech collected by the microphones 101, 102, and 103 to noise elimination processing such as beam forming, reverberation rejection processing, and the like to thereby create a speech signal of one channel. A speech detection section 112 detects a section in which a speech exists from the speech signal created by the noise elimination section 111, and compares a feature to be output from the feature extraction section 106 through the switch 105 in the speech detection section and the determination model stored in the determination model storage section 110 with each other for reference to thereby determine whether or not the sound-source position of the input speech is outside the objective area. Furthermore, the speech detection section 112 deletes a section regarding which it has been determined that the sound-source position of the section is outside the objective area from the section in which the speech exists, determines a speech recognition section that is an object of speech recognition, and cuts out a speech corresponding to the speech recognition section from the output of the noise elimination section 111 to output the cut out speech. A speech recognition section 113 subjects the speech cut out by the speech detection section 112 to speech recognition processing to thereby convert the speech into text data, and outputs the text data as a speech recognition result.

Figure 3:
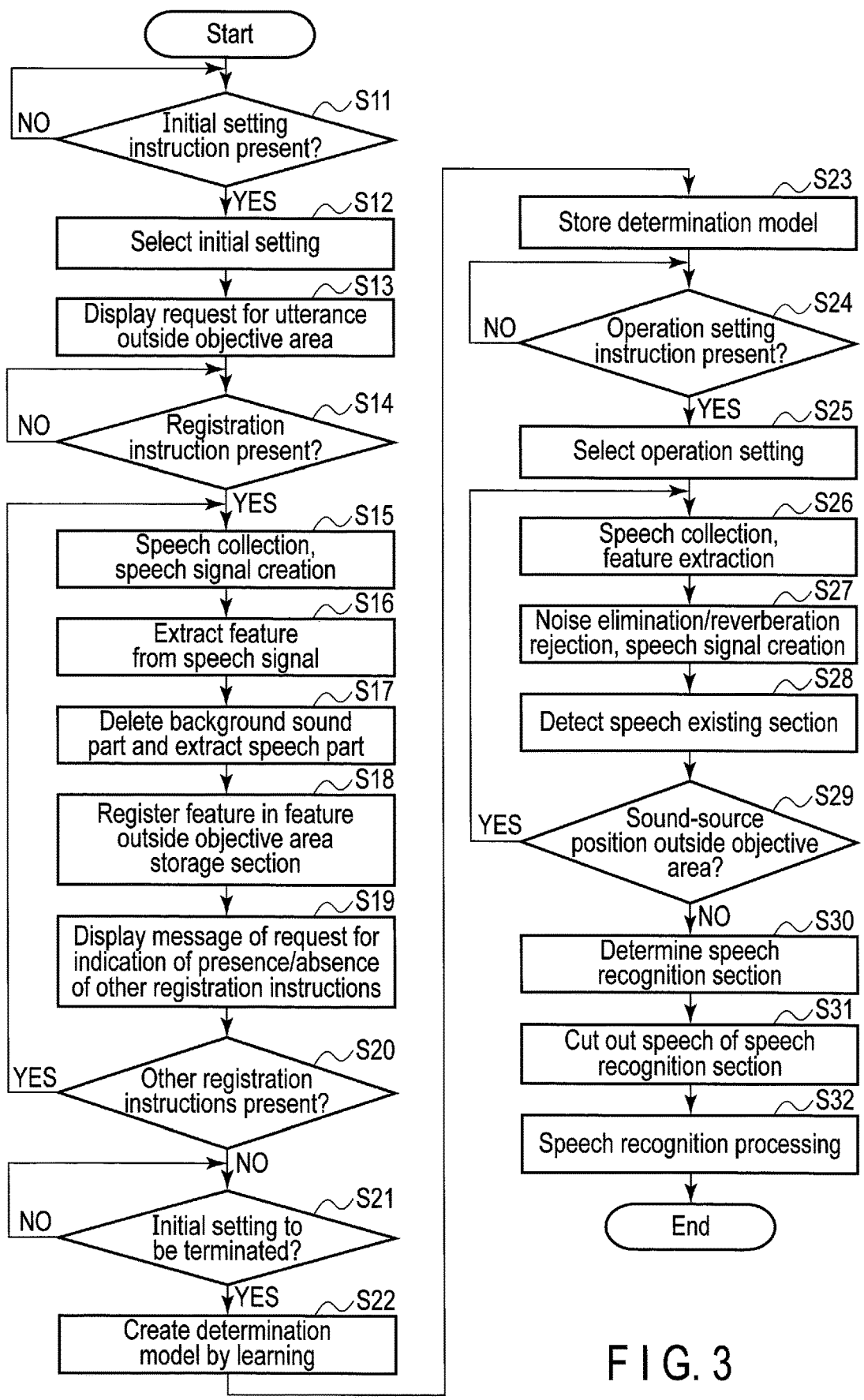
FIG. 3 is a flowchart showing a flow of processing of the sound processing apparatus according to the first embodiment.

With respect to the sound processing apparatus 100 according to this embodiment based on the above configuration, a flow of a series of processing is shown in FIG. 3, and the processing operation will be described below.

First, when the user operates the TV set 200 to place the TV set 200 in the initial setting mode of speech recognition, the TV set 200 transmits a notification of the initial setting mode of speech recognition to the sound processing apparatus 100. In the sound processing apparatus 100, upon receipt of the notification of the initial setting mode (step S11), the control section 104 connects the switch 105 to the initial setting side (step S12), and displays an utterance outside objective area request message saying "Please talk to the TV set at a position desired to be excluded from the recognition area of command utterance" on the display screen of the TV set 200 (step S13).

It is assumed that the user who has viewed the above message moves to the place of installation of the telephone set 300, instructs to carry out outside objective area registration, and utters arbitrary contents. At this time, upon receipt of the outside objective area registration instruction (step S14), the control section 104 collects a speech uttered by the user by using the microphones 101, 102, and 103 to thereby create speech signals of three channels (step S15). Next, the control section 104 extracts feature of the speech signals by means of the feature extraction section 106 at fixed frame periods (step S16), deletes a feature of the background sound part from the feature extracted by the speech feature extraction section 107, extracts a feature of the speech part therefrom (step S17), and registers (stores) the extracted feature in the feature outside objective area storage section 108 (step S18). Upon completion of the registration, the control section 104 displays a request for indication of presence/absence of instructions concerning other registrations on the TV set 200 (step S19).

Here, the control section 104 determines whether or not a next outside objective area registration instruction is present (step S20) and, when a registration instruction is present, the control section 104 returns to step S15 and, when a registration instruction is absent, the control section 104 waits for an instruction to terminate the initial setting mode of speech recognition (step S21). When the user operates the TV set 200 to input an instruction to terminate the initial setting mode of speech recognition, the TV set 200 transmits a notification of termination of the initial setting mode of speech recognition to the sound processing apparatus 100. In the sound processing apparatus 100, upon receipt of the notification of termination of the initial setting mode (step S21), the control section 104 activates the determination model creation section 109, creates, by learning, a determination model configured to determine whether or not a feature is outside the objective area on the basis of data of feature outside the objective area accumulated in the feature outside objective area storage section 108 (step S22), and stores the determination model created by learning in the determination model storage section 110 (step S23).

After termination of the initial setting mode, when the user operates the TV set 200 to place the TV set 200 in the operation mode of speech recognition, the TV set 200 transmits a notification of the operation mode of speech recognition to the sound processing apparatus 100. Upon receipt of the notification of the operation mode from the TV set 200 (step S24), the control section 104 connects the switch 105 to the operation side (step S25). In this state, when the user utters an arbitrary command at an arbitrary position, the control section 104 collects the speech by means of the microphones 101, 102, and 103, and extracts a feature thereof by means of the feature extraction section 106 (step S26).

Further, the control section 104 executes noise elimination processing such as beam forming, and reverberation rejection processing with respect to the collected speech signal by means of the noise elimination section 111 to thereby create a speech signal of one channel (step S27), and detects a section in which a speech exists from the speech signal created by the noise elimination section 111 by means of the speech detection section 112 (step S28). Then, the control section 104 compares a feature to be output from the feature extraction section 106 through the switch 105 in the speech detection section and the determination model stored in the determination model storage section 110 with each other for reference to thereby determine whether or not the sound-source position of the input speech is outside the objective area (step S29).

When the sound-source position is outside the objective area, the control section 104 deletes a section regarding which it has been determined that the sound-source position of the section is outside the objective area from the section in which the speech exists, and returns to step S26 to thereby advance the processing. On the other hand, when the sound-source position of the input speech is not outside the objective area, the control section 104 determines the speech recognition section which is an object of speech recognition (step S30), cuts out a speech corresponding to the speech recognition section from the output of the noise elimination section 111 (step S31), carries out speech recognition processing with respect to the speech cut out by the speech detection section 112 by means of the speech recognition section 113 to thereby convert the speech into text data, and outputs the text data as a speech recognition result (step S32).

In the configuration described above, the specific operational processing operation will be described below.

For example, it is assumed that the user sits in the chair 400 inside the objective area and utters "Reservation at eight tonight," as a speech command for the operation of the TV set 200. At this time, a similar feature does not exist in the feature outside objective area storage section 108, and hence a feature corresponding to the feature of the collected speech cannot be obtained by means of the determination model stored in the determination model storage section 110. As a result, in the speech detection section 112, it is determined that the utterance position of the user is inside the objective area. Thereby, in the speech detection section 112, the speech uttered as "Reservation at eight tonight" is cut out, and a text "Reservation at eight tonight" is output from the speech recognition section 113. As described above, in this embodiment, it is possible to carry out an operation of the TV set such as activation of recording reservation on the basis of the speech recognition result.

On the other hand, it is assumed that the user utters at the place of installation of the telephone set 300 "Please set my reservation at seven in the afternoon," in order to make, for example, a restaurant reservation. At this time, the place of installation of the telephone set 300 has already been registered as a place outside the objective area in the initial setting mode, and the determination model is provided with a feature similar to the feature of the collected speech. Accordingly, in the speech detection section 112, when the determination model and feature of the collected speech are compared with each other for reference, a feature analogous relationship between both of them is obtained. As a result, it is determined that the sound-source position of the input speech is outside the objective area, and output of the cut out speech is not executed. Accordingly, speech recognition by the speech recognition section 113 is not executed, and thus it is possible to prevent a malfunction in which recording reservation of the TV set 200 is activated by a reservation instruction from the place of installation of the telephone set 300 from occurring.

Next, detailed embodiments of the determination model creation section 109 and speech detection section 112 which are the features of this embodiment will be described below. Here, it is assumed that the feature stored in the feature outside objective area storage section 108 is a two-dimensional vector indicating a time difference between collected sound signals of the microphone 101 and microphone 102 arranged at the upper left and right positions of the TV set of the case where the collected sound signal of the microphone 103 arranged at the lower central position is made the criterion. It is possible to obtain this feature vector by using the method of detecting the maximum value of mutual correlation between the two collected sound signals.

Here, the feature vector corresponding to the speech section extracted by the speech feature extraction section 107 is stored in the feature outside objective area storage section 108. In the following explanation, let the number of the stored feature vectors be N, and the feature vector is expressed as $x_n$ ($1 \leq n \leq N$).

First, the method of expressing the determination model by the centroid $\bar{x}$ of the feature vector will be described below. The determination model $\bar{x}$ is obtained by the following formula, and is stored in the determination model storage section 110.

$$\bar{x} = \frac{1}{N}\sum_{n=1}^{N} x_n \qquad (1)$$

In the speech detection section 112, in the feature of the input signal, a section regarding which it is estimated that a speech exists therein is identified by using parameters such as sound volume (power) and the like, and thereby a feature vector yk (1≤k≤K) of the section concerned is obtained. However, K expresses the number of frames (number of feature vectors) of the section concerned. When the centroid of the feature vector $y_k$ is expressed by $\bar{y}$ of the following formula, determination is carried out on the basis of a distance between $\bar{y}$ and $\bar{x}$.

$$\bar{y} = \frac{1}{K}\sum_{k=1}^{K} y_k \qquad (2)$$

That is, in comparison with a threshold d set in advance, when $|\bar{y}-\bar{x}|<d$ is established, it is determined that the section concerned is outside the objective area, the section concerned is deleted and, when the section concerned is other than the section outside the objective area, it is determined that the section concerned is inside the objective area, a speech corresponding to the section concerned is cut out from the speech output from the noise elimination section 111 to thereby be output. Alternatively, $y_k$ and $\bar{x}$ may be compared with each other, and determination may be carried out for each frame. In this case, the percentage of the frames which have been determined as the frames outside the objective area is greater than or equal to a fixed value, the whole of the section concerned may be deleted or only the frames which have been determined as the frames outside the objective area may be deleted.

In the embodiment described above, although the description has been given on the assumption that the centroid $\bar{x}$ is the average of all of $x_n$, clustering based on vector quantization may be carried out, and a plurality of centroids may be stored as determination models. In this case, it is sufficient if the distance between the feature vector to be subjected to determination and model is defined as a distance between the feature vector and the nearest centroid. By doing so, it is possible to cope with a case where a place which becomes outside the objective area is an extensive area or a case where a plurality of places which become outside the objective area exist.

Next, an embodiment in which the determination model is expressed as a mixture Gaussian model (GMM) will be described below. The probability distribution p(x) of the feature vector x is modelized by using the following formula.

$$p(x) = \sum_{m=1}^{M} \pi_m N(x|\mu_m, \sigma_m) \qquad (3)$$

Here, $N(x|\mu_m, \alpha_m)$ expresses the Gaussian distribution of average $\mu_m$, and dispersion $\alpha_m$. M is a predetermined mixed number. The feature vector $x_n$ (1≤n≤N) is used as learning data, and model parameters $\pi_m, \mu_m$, and $\sigma_m$ (m=1, . . . , M) expressing the probability distribution thereof are learned.

For the learning of the parameters, the existing method such as EM algorithm and the like can be used. The model parameters obtained in this way are stored in the determination model storage section 110.

In the detection determination in the above speech detection section 112, the feature vector $y_k$ is used as in the case of the embodiment described above. The determination is carried out on the basis of the likelihood of $\bar{y}$ to be obtained by using the determination model. That is, in comparison with a threshold λ of the likelihood set in advance, when $p(\bar{y})>\lambda$ is established, it is determined that the detection is outside the objective area, and the section concerned is deleted and, when the detection is other than the detection outside the objective area, it is determined that the detection is inside the objective area, then a speech corresponding to the section concerned is cut out from the speech output from the noise elimination section 111, and the cut-out speech is output. Alternatively, $p(y_k)>\lambda$ may be evaluated, and determination may be carried out for each frame. In this case, when the percentage of the frames which have been determined as those outside the objective area is greater than or equal to a fixed value, the whole of the section concerned may be deleted or only the frames which have been determined as those outside the objective area may be deleted. As described above, by using the mixture Gaussian model GMM, it becomes possible to delete speeches from outside the objective area more accurately according to the distribution of the sound-source positions.

Second Embodiment

Figure 4:
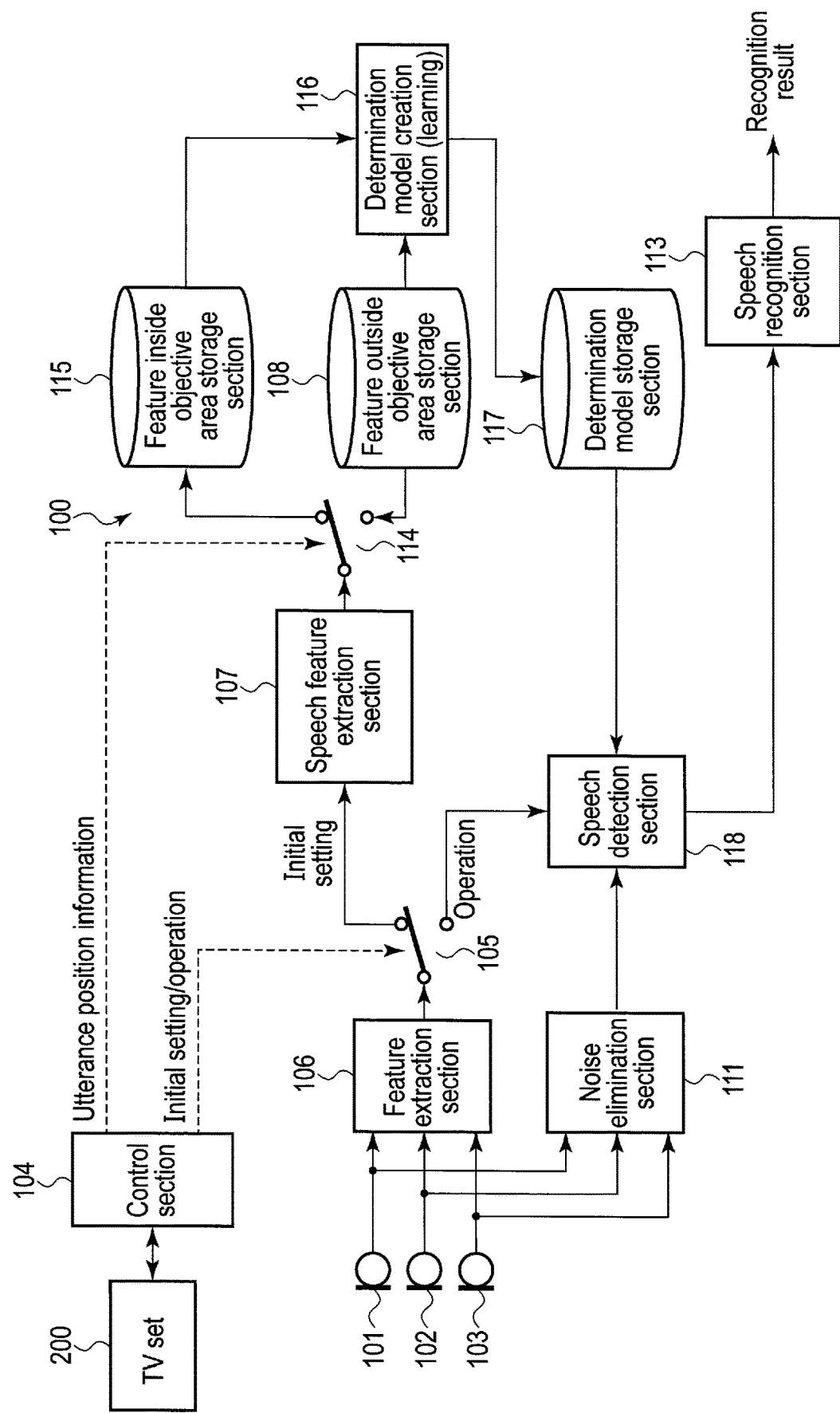
FIG. 4 is a block diagram showing the configuration of a sound processing apparatus according to a second embodiment.

Next, the configuration of a sound processing apparatus according to a second embodiment will be described below by referring to FIG. 4. In FIG. 4, constituent elements identical in function to those in FIG. 2 are denoted by reference symbols identical to those in FIG. 2, and descriptions of them are omitted.

This embodiment differs from the first embodiment in the point that the determination model is learned by using a speech inside the objective area in addition to the speech outside the objective area. That is, in this embodiment, a first initial setting mode (hereinafter, first mode, or initial setting mode identical to the case of the first embodiment) in which feature extraction/accumulation processing outside the objective area configured not to carry out speech recognition is executed, and second initial setting mode (hereinafter, second mode) in which feature extraction/accumulation processing of speech recognition inside the objective area is executed are provided and, when the user operates the TV set 200 to instruct to carry out initial setting of speech recognition, processing is carried out in such a manner that the first mode and second mode are selected in sequence.

In FIG. 4, a switch 114 selectively switches between the first mode side and second mode side according to an instruction from a control section 104. When the switch 114 has selected the first mode side, a feature outside objective area storage section 108 is configured to store therein a speech feature extracted by a speech feature extraction section 107 as a feature outside the objective area as in the case of the first embodiment. Conversely, when the switch 114 has selected the second mode side, a feature inside objective area storage section 115 is configured to store therein a speech feature extracted by the speech feature extraction section 107 as a feature inside the objective area. A determination model creation section 116 learns a determination model configured to directly determine whether the sound-source position of an input speech at the time of operation is outside the objective area or inside the objective area on the basis of the feature outside the objective area stored in the feature outside objective area storage section 108 and feature inside the objective area stored in the feature inside objective area storage section 115. A determination model storage section 117 stores therein the determination model created by the determination model creation section 116 by learning.

A speech detection section 118 detects a section in which a speech exists from a speech signal created by a noise elimination section 111, and compares a feature output from a feature extraction section 106 through a switch 105 and the determination model stored in the determination model storage section 117 with each other for reference to thereby determine whether the sound-source position of the input speech is outside the objective area or inside the objective area. Furthermore, the speech detection section 118 deletes a section the sound-source position of which has been determined as that outside the objective area from the section in which a speech exists, determines a section which has been determined as a section inside the objective area as a speech recognition section that is an object of speech recognition, cuts out a speech corresponding to the speech recognition section from the output of the noise elimination section 111, and outputs the cut-out speech.

Figure 5:
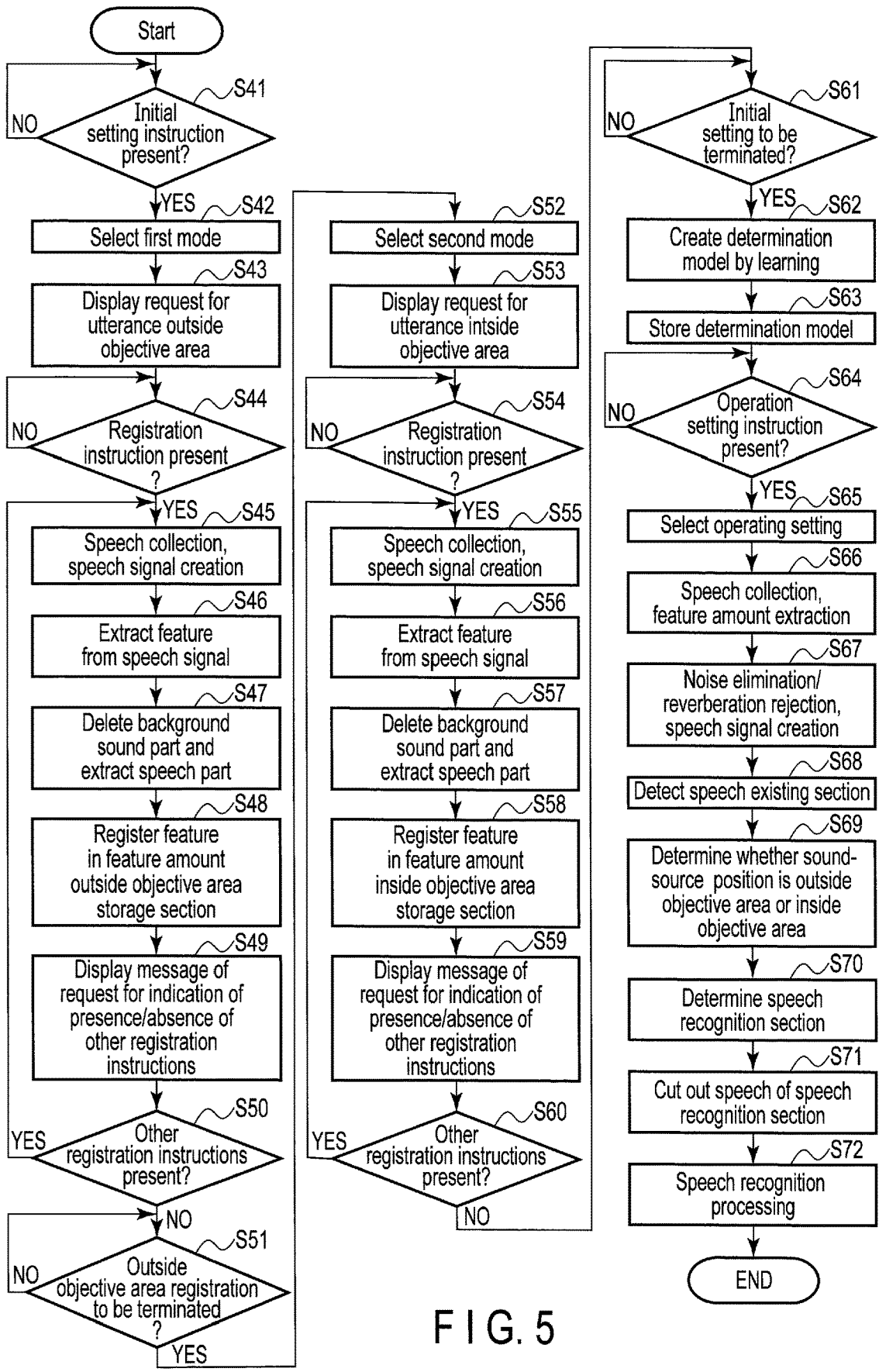
FIG. 5 is a flowchart showing a flow of processing of the sound processing apparatus according to the second embodiment.

In the sound processing apparatus 100 according to this embodiment based on the configuration described above, a flow of a series of processing is shown in FIG. 5, and the processing operation will be described below.

First, when the user operates the TV set 200 to place the TV set 200 in the initial setting mode of speech recognition, the TV set 200 transmits a notification of the initial setting mode of speech recognition to the sound processing apparatus 100. In the sound processing apparatus 100, upon receipt of the notification of the initial setting mode (step S41), a control section 104 connects the switch 105 to the initial setting side, connects the switch 114 to the first mode side (step S42), and displays an utterance outside objective area request message saying "Please talk to the TV set at a position desired to be excluded from the recognition area of command utterance," on the display screen of the TV set 200 (step S43).

It is assumed that the user who has viewed the above message moves to the place of installation of the telephone set 300, instructs to carry out outside objective area registration, and utters arbitrary contents. At this time, the TV set 200 transmits an outside objective area registration instruction to the sound processing apparatus 100. In the sound processing apparatus 100, upon receipt of the outside objective area registration instruction (step S44), the control section 104 collects a speech uttered by the user by using the microphones 101, 102, and 103 to thereby create speech signals of three channels (step S45). Next, the control section 104 extracts a feature of each of the speech signals by means of the feature extraction section 106 at fixed frame periods (step S46), deletes a feature of the background sound part from the feature extracted by the speech feature extraction section 107, extracts a feature of the speech part therefrom (step S47), and stores the extracted feature in the feature outside objective area storage section 108 (step S48). Upon completion of the registration, the control section 104 displays a request for indication of presence/absence of instructions concerning other registrations on the TV set 200 (step S49).

Here, the control section 104 determines whether or not a next outside objective area registration instruction is present (step S50) and, when a registration instruction is present, the control section 104 returns to step S45 and, when a registration instruction is absent, the control section 104 waits for an instruction to terminate the outside objective area registration (step S51). When the user operates the TV set 200 to input an instruction to terminate the outside objective area registration, the TV set 200 transmits a notification of termination of the outside objective area registration to the sound processing apparatus 100. In the sound processing apparatus 100, upon receipt of the notification of termination of the outside objective area registration (step S51), the control section 104 connects the switch 114 to the second mode side (step S52), and displays an utterance inside objective area request message saying "Please talk to the TV set from the command utterance recognition object area," on the display screen of the TV set 200 (step S53).

It is assumed that the user who has viewed the above message moves to the place of installation of the chair 400, instructs to carry out inside objective area registration, and utters arbitrary contents. At this time, the TV set 200 transmits an inside objective area registration instruction to the sound processing apparatus 100. In the sound processing apparatus 100, upon receipt of the inside objective area registration instruction (step S54), the control section 104 collects a speech uttered by the user by using the microphones 101, 102, and 103 to thereby create speech signals of three channels (step S55). Next, the control section 104 extracts a feature of each of the speech signals by means of the feature extraction section 106 at fixed frame periods (step S56), deletes a feature of the background sound part from the feature extracted by the speech feature extraction section 107, extracts a feature of the speech part therefrom (step S57), and stores the extracted feature in the feature inside objective area storage section 115 (step S58). Upon completion of the registration, the control section 104 displays a request for indication of presence/absence of instructions concerning other registrations on the TV set 200 (step S59).

Here, the control section 104 determines whether or not a next inside objective area registration instruction is present (step S60) and, when a registration instruction is present, the control section 104 returns to step S55 and, when a registration instruction is absent, the control section 104 waits for an instruction to terminate the initial setting mode (step S61). When the user operates the TV set 200 to input an instruction to terminate the initial setting mode, the TV set 200 transmits a notification of termination of the initial setting mode to the sound processing apparatus 100. In the sound processing apparatus 100, upon receipt of the initial setting mode termination notification (step S61), the control section 104 activates the determination model creation section 116, learns a determination model configured to determine whether a feature is outside the objective area or inside the objective area on the basis of data items of the feature outside the objective area and feature inside the objective area accumulated in the feature outside objective area storage section 108 and feature inside objective area storage section 115 (step S62), and stores the determination model created by learning in the determination model storage section 117 (step S63).

After termination of the initial setting mode, when the user operates the TV set 200 to place the TV set 200 in the operation mode of speech recognition, the TV set 200 transmits a notification of the operation mode of speech recognition to the sound processing apparatus 100. Upon receipt of the notification of the operation mode from the TV set 200 (step S64), the control section 104 connects the switch 105 to the operation side (step S65). In this state, when the user utters an arbitrary command at an arbitrary position, the control section 104 collects the speech by means of the microphones 101, 102, and 103, and extracts a feature thereof by means of the feature extraction section 106 (step S66). Further, the control section 104 executes noise elimination processing such as beam forming, and reverberation rejection processing with respect to the collected speech signal by means of the noise elimination section 111 to thereby create a speech signal of one channel (step S67), and detects a section in which a speech exists from the speech signal created by the noise elimination section 111 by means of the speech detection section 118 (step S68). Then, the control section 104 compares a feature to be output from the feature extraction section 106 through the switch 105 in the speech detection section and the determination model stored in the determination model storage section 117 with each other for reference to thereby determine whether the sound-source position of the input speech is outside the objective area or inside the objective area (step S69), deletes a section regarding which it has been determined that the sound-source position of the section is outside the objective area from the section in which the speech exists, and determines a section determined as a section inside the objective area as a speech recognition section that is an object of speech recognition (step S70). Furthermore, the control section 104 cuts out a speech corresponding to the speech recognition section from the output of the noise elimination section 111 (step S71), carries out speech recognition processing with respect to the speech cut out by the speech detection section 112 by means of the speech recognition section 113 to thereby convert the speech into text data, and outputs the text data as a speech recognition result (step S72).

In the configuration described above, the specific operational processing operation will be described below.

For example, it is assumed that the user sits in the chair 400 inside the objective area and utters "Reservation at eight tonight," as a speech command for an operation of the TV set 200. At this time, a similar feature is stored in the feature inside objective area storage section 115, and hence in the determination model stored in the determination model storage section 117, a feature corresponding to the feature of the speech collected inside the objective area can be obtained. As a result, in the speech detection section 118, the utterance position of the user is determined as a position inside the objective area. Thereby, in the speech detection section 118, the speech uttered as "Reservation at eight tonight," is cut out, and a text "Reservation at eight tonight" described above, in this embodiment, it is possible to carry out operation of the TV set such as activation of recording reservation and the like on the basis of the speech recognition result.

On the other hand, it is assumed that the user utters at the place of installation of the telephone set 300 "Please set my reservation at seven in the afternoon," in order to make, for example, a restaurant reservation. At this time, the place of installation of the telephone set 300 has already been registered as a place outside the objective area in the initial setting mode and, in the determination model, a feature similar to the feature of the speech collected outside the objective area is obtained. As a result, in the speech detection section 118, the utterance position of the user is determined as a position outside the objective area, and output of the cut out speech is not executed. Accordingly, speech recognition by the speech recognition section 113 is not executed, and it is possible to prevent a malfunction in which recording reservation of the TV set 200 is activated by a reservation instruction from the place of installation of the telephone set 300 from occurring.

Next, detailed embodiments of the determination model creation section 116 and speech detection section 118 which are the features of this embodiment will be described below. It is assumed that each of the feature stored in the feature outside objective area storage section 108 and feature inside objective area storage section 115 is a two-dimensional vector indicating a time difference between signals of the microphone 101 and microphone 102 arranged at the upper left and right positions of the TV set of the case where the collected sound signal of the microphone 103 arranged at the lower central position is made the criterion. Let the number of the feature vectors stored in the feature outside objective area storage section 108 be $N_{out}$, and the feature vector is expressed as $x_n$ ($1 \leq n \leq N_{out}$). Further, let the number of the feature vectors stored in the feature inside objective area storage section 115 be $N_{in}$, and the feature vector is expressed as $z_n$ ($1 \leq n \leq N_{in}$).

The case where the determination model is expressed by GMM of the feature vector will be described below. The probability distributions Pout(x) and Pin(z) of the feature vectors x and z are modelized by using the following formulas.

$$p_{out}(x) = \Sigma_{m=1}^{M} \pi_m N(x|\mu_m, \sigma_m) \quad (4)$$

$$p_{in}(z) = \Sigma_{m=1}^{M} \pi_m N(z|\mu_m, \sigma_m) \quad (3)$$

The feature vector $x_n$ ($1 \leq n \leq N_{out}$) and feature vector $z_n$ ($1 \leq n \leq N_{in}$) are used to learn model parameters $\pi_m$, $\mu_m$, and $\sigma_m$ (m=1, M), and model parameters $\pi'_m$, $\mu'_m$, and $\pi'_m$ (m=1, . . . , M), respectively by EM algorithm, and the obtained model parameters are stored in the determination model storage section 117.

In the speech detection section 118, parameters such as sound volume (power) and the like among the feature of the input signals are used to identify a section regarding which it is estimated that a speech exists therein, and a feature vector $y_k$ ($1 \leq k \leq K$) of the section concerned is obtained. However, K expresses the number of frames (number of feature vectors) of the section concerned. Determination is carried out by using the centroid $\bar{y}$ of $y_k$ and a threshold q set in advance. That is, when Pout($\bar{y}$)−Pin($\bar{y}$)>q is established, the section is determined as a section outside the objective area, and the section concerned is deleted and, when a condition other than the above is established, the section is determined as a section inside the objective area, and a speech corresponding to the section concerned is cut out from the speech output from the noise elimination section 111 to thereby be output. Alternatively, Pout($\bar{y}$)−Pin($\bar{y}$)>q may be evaluated for each frame and thereby determination may be carried out. In this case, when the percentage of the frames which have been determined as those outside the objective area is greater than or equal to a fixed value, the whole of the section concerned may be deleted or only the frames which have been determined as those outside the objective area may be deleted.

Next, an embodiment in which determination of the objective area is carried out by using the neural network will be described below. As the feature vectors used for determination, a power difference between the microphones is used in addition to the time difference between the microphones described above. A four-dimensional vector including two dimensions expressing the power ratio (or logarithm thereof) between the collected sound signals of the microphone 101 and microphone 102 of the case where the collected sound signal of the microphone 103 is made the criterion is made the feature vector.

Let the number of feature vectors stored in the feature outside objective area storage section 108 be Nout, and the feature vector is expressed as $x_n$ ($1 \leq n \leq N_{out}$). Further, let the number of feature vectors stored in the feature inside objective area storage section 115 be $N_{in}$, and the feature vector is expressed as $z_n$ ($1 \leq n \leq N_{in}$). An example of learning data of the neural network of the case of $N_{out}$=1000, and $N_{in}$=2000 is shown in FIG. 6. The column "determination" becomes 1 in the case of "outside the objective area", and becomes 0 in the case of "inside the objective area". The neural network carries out learning in such a manner that four-dimensional vectors of the time difference and power difference are used as the input, and a scalar value expressing "determination" is predicted. Regarding the configuration of the network, it is sufficient if the input layer is constituted of 4 nodes, output layer is constituted of 1 node, and intermediate layer is set to have, for example, 5 nodes times 2 layers. As the learning algorithm, it is sufficient if the existing method such as the error back-propagation method is used. Weight values between nodes obtained by learning are stored in the determination model storage section 117.

In the speech detection section 118, regarding the feature of the input signal, a section presumed to contain therein a speech is identified by using power or the like, and a feature vector $y_k$ ($1 \leq k \leq K$) of the section concerned is obtained. Determination is carried out by using the centroid $\overline{y}$ of $y_k$ and a threshold q set in advance. When the estimate value output by inputting the feature vector y to the learned neural network is expressed as $P_{nn}(y)$, if $P_{nn}(\overline{y}) > q$ is established, the section is determined as a section outside the objective area, and the section concerned is deleted and, if a condition other than the above is established, the section is determined as section inside the objective area, a speech corresponding to the section concerned is cut out from the speech output from the noise elimination section 111 to thereby be output. Alternatively, $P_{nn}(y_k) > q$ may be evaluated for each frame, and determination may thereby be carried out. In this case, when the percentage of the frames which have been determined as those outside the objective area is greater than or equal to a fixed value, the whole of the section concerned may be deleted or only the frames which have been as those outside the objective area may be deleted. By using the neural network for determination, it becomes possible to carry out determination with a high degree of accuracy in various cases such as a case where a plurality of ranges outside the objective area exist, case of a complicated shape, case where the objective area is small, and the like. Further, it is possible to carry out adjustment in such a manner that when the threshold q is made larger, the objective area is made larger and, conversely, when the threshold q is made smaller, the objective area is made smaller.

Besides the method based on GMM described above, and method based on the neural network, various determination methods such as the method based on the support vector machine, N-nearest neighbor algorithm, and the like can be used.

Third Embodiment

In the embodiments described above, although the descriptions have been given on the assumption that the collected sound signals of the microphones 101, 102, and 103 to be input to the feature extraction section 106 are input to the noise elimination section 111, configurations other than the above are also practicable. For example, among the three microphones, any one or two of them may be used for input to the noise elimination section 111. Alternatively, one or more microphones other than the microphones 101, 102, and 103 may be prepared and used. Or, part or all of microphones prepared separately may be combined and used. A microphone used for determination as to inside/outside the objective area, and microphone used to collect an input speech of speech recognition differ from each other in the favorable characteristics and installation position in some cases, and hence it is advisable to use microphones suitable for the purposes.

Figure 7:
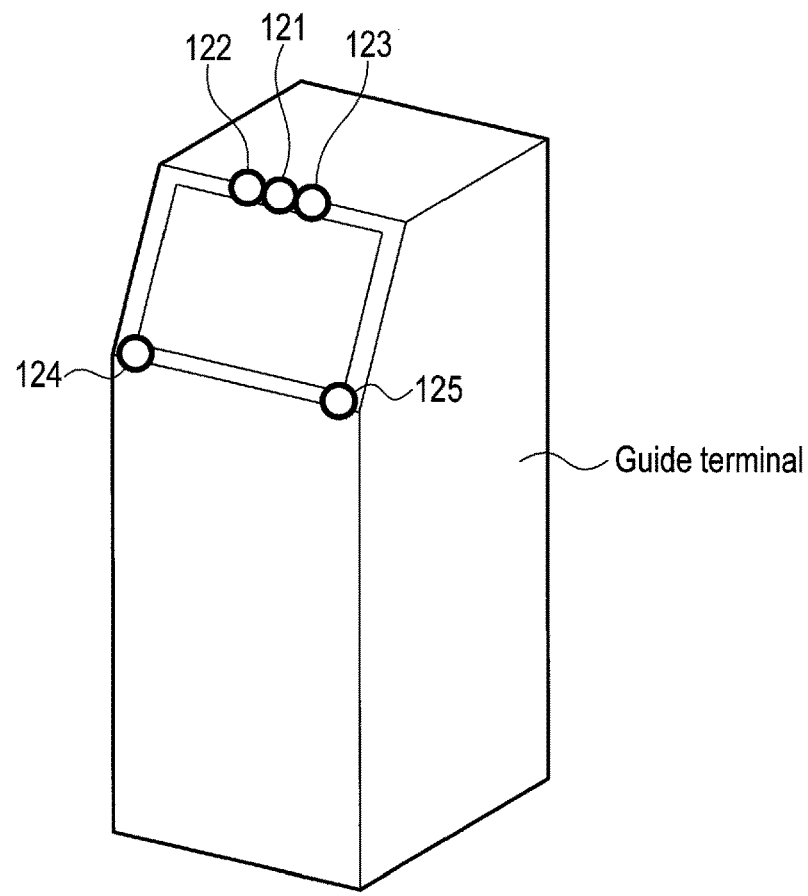
FIG. 7 is an external view showing a guiding apparatus in which a sound processing apparatus according to a third embodiment provided with a speech recognition function is incorporated.

An example in which the sound processing apparatus according to this embodiment is applied to the guide terminal of a shopping center is shown in FIG. 7. In this example, a microphone 121 is arranged at an upper central position of the display screen, microphones 122 and 123 are adjacently arranged on both sides of the microphone 121, and microphones 124 and 125 are arranged at lower right and left positions separately from each other. The configuration is contrived in such a manner that signals collected by the microphones 121, 124, and 125 are input to the feature extraction section 106, and signals collected by the microphones 121, 122, and 123 are input to the noise elimination section 111.

That is, in the determination as to inside/outside the objective area, a larger time difference between microphones attributable to the sound-source positions makes the determination easier, and hence it is necessary to make the distance between microphones large to a certain degree. On the other hand, it is necessary to set the distance between microphones used for beam forming for noise elimination comparatively small. For this reason, it is appropriate to arrange the microphones 121 to 126 according to the above layout.

It should be noted that in the embodiments described above, although the descriptions have been given on the assumption that the speech recognition section 113 is incorporated in the TV set or guide terminal, the speech recognition section 113 may be connected through a network. That is, a configuration in which a speech detected and output by the speech detection section 112 or 118 is transmitted to a server through the network, then is received by a speech recognition section 113 constructed on the server, whereby the speech recognition processing is executed may be employed. By contriving the configuration in this way, it is possible to carry out speech recognition processing with sufficient computer resources, and hence it is possible to realize a high degree of recognition accuracy.

Further, in the embodiments described above, although the descriptions have been given on the assumption that the speech detected and output by the speech detection section 112 or 118 is subjected to speech recognition, configurations other than the above are also practicable. For example, it is also possible to contrive the configuration in such a manner that the output speech is input to a recording apparatus to be recorded. As an application example, a case where among speeches of a conversation between the salesperson and customer, only speeches of the salesperson are desired to be recorded, or the like is conceivable. In this case, when setting is made in such a manner that the position of the salesperson is inside the objective area, and the position of the customer is outside the objective area, it is possible to selectively record only the speeches of the salesperson.

As described above, the sound processing apparatus according to this embodiment provides an advantage that instructions are carried out by uttering from a position outside the objective area and from a position inside the objective area, whereby it is possible to easily set the objective area in conformity with the environment in which the apparatus is placed, and selectively collect only utterances from the inside of the objective area.

Figure 8:
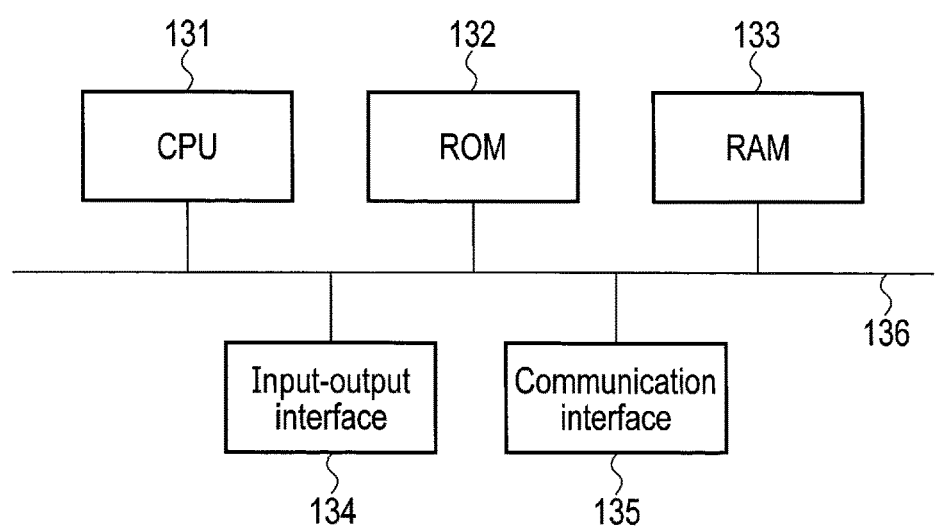
FIG. 8 is a block diagram showing the configuration of a case where each of the sound processing apparatuses according to the first to third embodiments is realized by a computer apparatus.

Next, the hardware configuration of each of the sound processing apparatuses according to the first to third embodiments having the speech recognition function will be described below by using FIG. 8. FIG. 8 is a block diagram showing a hardware configuration example of the sound processing apparatuses according to the first to third embodiments.

Each of the sound processing apparatuses 100 according to the first to third embodiments is provided with a control device such as a Central Processing Unit (CPU) 131 or the like, storage device such as a Read Only Memory (ROM) 132, Random Access Memory (RAM) 133, and the like, input-output interface 134 to which microphones 101 to 103, and 121 to 125, operation input device, and display device (TV set) are connected, communication interface 135 connected to a network and configured to carry out communication, and bus 136 connecting all the parts to each other.

The programs to be executed by the sound processing apparatuses according to the first to third embodiments are incorporated in the ROM 132 and the like in advance to be provided.

The programs to be executed by the sound processing apparatuses according to the first to third embodiments may also be configured in such a manner that the programs are recorded on a computer-readable recording medium such as a Compact Disk Read Only Memory (CD-ROM), flexible disk (FD), Compact Disk Recordable (CD-R), Digital Versatile Disk (DVD), and the like in a file of an installable format or executable format, and are provided as computer program products.

Furthermore, the programs to be executed by the sound processing apparatuses according to the first to third embodiments may also be configured in such a manner that the programs are stored in a computer connected to a network such as the Internet, and the like, and are downloaded through the network to thereby be provided. Further, the programs to be executed by the sound processing apparatuses according to the first to third embodiments may also be configured in such a manner that the programs are provided or distributed through a network such as the Internet, and the like.

The programs to be executed by the sound processing apparatuses according to the first to third embodiments can make the computer function as each of the sections of the signal processing apparatus described above. In this computer, the CPU 131 can read the programs from the computer-readable storage medium into the main storage unit to thereby execute the programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sound processing apparatus comprising:
a plurality of first microphones that are arranged at positions different from each other in a space comprising an objective area and a place outside the objective area, and obtains a first sound comprising first speech uttered at the place outside the objective area;
a second microphone that is arranged in the space, and obtains second speech;
a feature extractor that extracts a first feature from the first sound obtained by the plurality of first microphones, and extracts a second feature from the second speech obtained by the second microphone, the first feature comprising a speech feature corresponding to the first speech obtained by the plurality of first microphones, and a background sound corresponding to sound in the first sound other than the first speech;
a speech feature extractor configured to extract the speech feature from the first feature, and store the speech feature in a storage;
a determination model creator that creates a determination model configured to determine whether an utterance position of a portion of the second speech is in the place outside the objective area by learning based at least in part on the speech feature stored in the storage;
a speech detector that eliminates the portion of the second speech from the second speech obtained by the second microphone when it is determined that the portion of the second speech is uttered at the place outside the objective area based at least in part on the speech feature of the first speech and the determination model, wherein the speech detector detects and outputs remaining speech from the second speech; and
a switch configured to switch between an initial setting mode and an operation mode in response to instructions sent from a controller, wherein the first speech is obtained in the initial setting mode, the second speech is obtained in the operation mode, and the controller compares a feature of the portion of the second speech and the determination model in the operation mode.

2. The sound processing apparatus of claim 1, wherein the determination model creator carries out learning of the determination model based at least in part on the first feature of the first speech uttered at the place outside the objective area in the space and a third feature of a third speech uttered at the place outside of the objective area, the third speech obtained by the first plurality of microphones.

3. The sound processing apparatus of claim 1, wherein the plurality of first microphones comprises the second microphone.

4. The sound processing apparatus of claim 1, further comprising a noise elimination device that eliminates noise from the second speech obtained by the second microphone, wherein the speech detector eliminates the portion of the second speech uttered outside of the objective area from the second speech after the noise has already been eliminated by the noise elimination device based at least in part on the first feature of the first speech and the determination model, wherein the speech detector detects and outputs the remaining speech from the second speech.

5. The sound processing apparatus of claim 1, further comprising a recognition device configured to recognize contents of the remaining speech detected by the speech detector.

6. A speech recognition apparatus comprising:
a plurality of first microphones that are arranged at positions different from each other in a space comprising an objective area and a place outside the objective area, and obtains a first sound comprising first speech uttered at the place outside the objective area;

a second microphone that is arranged in the space, and obtains second speech;
a feature extractor that extracts a first feature from the first sound obtained by the plurality of first microphones, and extracts a second feature from the second speech obtained by the second microphone, the first feature comprising a speech feature corresponding to the first speech obtained by the plurality of first microphones, and a background sound corresponding to sound in the first sound other than the first speech;
a speech feature extractor configured to extract the speech feature from the first feature, and store the speech feature in a storage;
a determination model creator that creates a determination model configured to determine whether an utterance position of a portion of the second speech is outside the objective area by learning based at least in part on the speech feature stored in the storage;
a speech detector that eliminates the portion of the second speech from the second speech obtained by the second microphone when it is determined that the portion of the second speech is uttered at the place outside the objective area based at least in part on the speech feature of the first speech and the determination model, wherein the speech detector detects and outputs remaining speech from the second speech;
a recognition device that recognizes contents of the remaining speech detected by the speech detector; and
a switch configured to switch between an initial setting mode and an operation mode in response to instructions sent from a controller, wherein the first speech is obtained in the initial setting mode, the second speech is obtained in the operation mode, and the controller compares a feature of the portion of the second speech and the determination model in the operation mode.

7. A method for sound processing, the method comprising:
arranging a plurality of first microphones at positions different from each other in a space comprising an objective are and a place outside the objective area;
obtaining a first sound comprising first speech uttered at the place outside the objective area by the plurality of first microphones;
arranging a second microphone in the space;
obtaining second speech by the second microphone;
extracting a first feature from the first sound obtained by the plurality of first microphones, the first feature comprising a speech feature corresponding to the first speech obtained by the plurality of first microphones, and a background sound corresponding to sound in the first sound other than the first speech;
extracting a second feature from the second speech;
extracting the speech feature from the first feature;
storing the speech feature in a storage;
creating a determination model configured to determine whether an utterance position of a portion of the second speech is outside the objective area by learning based at least in part on the speech feature stored in the storage; and
eliminating the portion of the second speech from the second speech obtained by the second microphone when it is determined that the portion of the second speech is uttered at the place outside the objective area based at least in part on the speech feature of the first speech and the determination model;
detecting remaining speech from the second speech;
outputting the remaining speech;
switching between an initial setting mode and an operation mode in response to instructions sent from a controller, wherein the first speech is obtained in the initial setting mode, the second speech is obtained in the operation mode; and
comparing a feature of the portion of the second speech and the determination model in the operation mode.

8. A method of speech recognition, the method comprising:
arranging a plurality of first microphones at positions different from each other in a space comprising an objective area and a place outside an objective area;
obtaining a first sound comprising first speech uttered at the place outside the objective area by the plurality of first microphones;
arranging a second microphone in the space;
obtaining second speech by the second microphone;
extracting a first feature from first sound obtained by the plurality of first microphones, the first feature comprising a speech feature corresponding to the first speech obtained by the plurality of first microphones, and a background sound corresponding to sound in the first sound other than the first speech;
extracting a second feature from the second speech;
extracting the speech feature from the first feature;
storing the speech feature in a storage;
creating a determination model configured to determine whether an utterance position of a portion of the second speech is outside the objective area by learning based at least in part on the speech feature stored in the storage;
eliminating the portion of the second speech from the second speech obtained by the second microphone when it is determined that the portion of the second speech is uttered at the place outside the objective area based at least in part on the speech feature of the first speech and the determination model;
detecting remaining speech from the second speech;
recognizing contents of the remaining speech;
switching between an initial setting mode and an operation mode in response to instructions sent from a controller, wherein the first speech is obtained in the initial setting mode, the second speech is obtained in the operation mode; and
comparing a feature of the portion of the second speech and the determination model in the operation mode.

9. A non-transitory computer-readable storage comprising a computer program that is executable by a computer used in a sound processing program, the computer program comprising instructions for causing the computer to execute functions of:
extracting a first feature from a first sound comprising first speech uttered at a place outside an objective area, and obtained by a plurality of first microphones that are arranged at positions different from each other in a space comprising the objective area and the place outside the objective area, the first feature comprising a speech feature corresponding to the first speech obtained by the plurality of first microphones, and a background sound corresponding to sound in the first sound other than the first speech;
extracting the speech feature from the first feature;
storing the speech feature in a storage;
creating a determination model configured to determine whether an utterance position of a portion of second speech obtained by a second microphone that is arranged in the space is outside the objective area by learning based at least in part on the speech feature stored in the storage; and eliminating the portion of the second speech from the second speech when it is determined that the portion of the second speech is uttered at the place outside the objective area based at least in part on the speech feature of the first speech and the determination model;

detecting remaining speech from the second speech;

outputting the remaining speech;

switching between an initial setting mode and an operation mode in response to instructions sent from a controller, wherein the first speech is obtained in the initial setting mode, the second speech is obtained in the operation mode; and compares a feature of the portion of the second speech and the determination model in the operation mode.

10. A non-transitory computer-readable storage comprising a computer program that is executable by a computer used in a speech recognition program, the computer program comprising instructions for causing the computer to execute functions of:

extracting a first feature from a first sound comprising first speech uttered at a place outside an objective area, and obtained by a plurality of first microphones that are arranged at positions different from each other in a space comprising the objective area the place outside the objective area, the first feature comprising a speech feature corresponding to the first speech obtained by the plurality of first microphones, and a background sound corresponding to sound in the first sound other than the first speech;

extracting the speech feature from the first feature;

storing the speech feature in a storage;

creating a determination model configured to determine whether an utterance position of a portion of second speech obtained by a second microphone that is arranged in the space is outside the objective area by learning based at least in part on the speech feature amount of the first speech uttered outside the objective area stored in the storage; and eliminating the portions of the second speech from the second speech when it is determined that the portion of the second speech is uttered at the place outside the objective area based at least in part on the speech feature of the first speech and the determination model;

detecting remaining speech from the second speech;

outputting the remaining speech;

recognizing contents of the remaining speech;

switching between an initial setting mode and an operation mode in response to instructions sent from a controller, wherein the first speech is obtained in the initial setting mode, the second speech is obtained in the operation mode; and compares a feature of the portion of the second speech and the determination model in the operation mode.

* * * * *